United States Patent

Conroy et al.

[15] 3,685,019

[45] Aug. 15, 1972

[54] EDITING APPARATUS

[72] Inventors: Thomas P. Conroy, Satellite Beach; Walter G. Fredrickson; Howard A. Thrailkill, both of Indialantic, all of Fla.

[73] Assignee: Harris-Intertype Corporation, Cleveland, Ohio

[22] Filed: May 14, 1970

[21] Appl. No.: 37,192

[52] U.S. Cl. .......... 340/172.5

[51] Int. Cl. .......... G06f 3/14

[58] Field of Search .......... 340/172.5, 324 A

[56] References Cited

UNITED STATES PATENTS

| | | | |
|---|---|---|---|
| 3,346,853 | 10/1967 | Koster et al. | 340/172.5 |
| 3,289,176 | 11/1966 | Garth, Jr. et al | 340/172.5 |
| 3,248,705 | 4/1966 | Dammann et al. | 340/172.5 |
| 3,307,154 | 2/1967 | Garth, Jr. et al | 340/172.5 |
| 3,364,473 | 1/1968 | Reitz et al | 340/172.5 |
| 3,389,404 | 6/1968 | Koster | 340/172.5 |
| 3,453,384 | 7/1969 | Donner et al. | 340/172.5 X |

*Primary Examiner*—Paul J. Henon
*Assistant Examiner*—Melvin B. Chapnick
*Attorney*—Yount and Tarolli

[57] ABSTRACT

A self-contained, unitary console for keyboard editing of wire-service or blind keyboarded text. The text is displayed on a cathode ray tube and, after being edited, may provide the input for a computer or an automatic typesetter. A "hard-wired logic" interface, connected ahead of the input to the memory in the console, strips or otherwise modifies special codes read in from the input tape to provide the desired instructions to the cathode ray tube display.

16 Claims, 5 Drawing Figures

INVENTORS
THOMAS P. CONROY,
WALTER G. FREDRICKSON,
& HOWARD A. THRAILKILL
BY
William J. Flynn
ATTORNEY INVENTORS
THOMAS P. CONROY,
WALTER G. FREDRICKSON,
& HOWARD A THRAILKILL
BY
William J. Flynn
ATTORNEY INVENTORS
THOMAS P. CONROY,
WALTER G. FREDRICKSON,
& HOWARD A. THRAILKILL
BY
William J. Flynn
ATTORNEY INVENTORS
THOMAS P. CONROY,
WALTER G. FREDRICKSON,
& HOWARD A. THRAILKILL
BY
William J. Flynn
ATTORNEY

EDITING APPARATUS

This invention relates to an editing or proofing and correcting apparatus which is particularly adapted for use with unedited text to enable editing changes to be entered from a keyboard, with the text being displayed visually as the editing proceeds, after which the final edited copy may be used as the input to a computer or an automatic typesetter.

One of the problems encountered in the use of a visual display apparatus for editing unedited text is that the input text contains various special codes, for spacing or various other instructions to the typesetter, which are not useful in the visual display of the text being edited. In accordance with the present invention, an interface is provided ahead of the memory in the editing apparatus to delete or modify such special codes so as to reduce the amount of the memory's capacity taken up by data not used in the visual display of the text being edited. This enables more efficient utilization of the memory to store the graphic character codes and only those special instruction codes which are necessary to provide the desired visual display for editing purposes.

Accordingly, it is a principal object of this invention to provide a novel and improved visual display apparatus for editing unedited text, such as newspaper copy, which effectively strips unwanted instruction codes from the unedited text before it is entered into the memory from which the visual display is obtained.

Another object of this invention is to provide such an apparatus having novel provision for controlling the text display in accordance with the bold face or light face instruction codes contained in the unedited input copy, but without having these codes entered into memory as they appear in the unedited input copy.

Another object of this invention is to provide such an apparatus having novel provision for controlling the capitalization or not of the graphic characters displayed visually, but without the necessity of entering into memory the instruction codes for these functions as they appear in the unedited input copy.

Another object of this invention is to provide such an apparatus having novel provision for returning to the final edited text certain instruction codes for the typesetter which were stripped from the unedited copy before visual display and editing.

Another object of this invention is to provide a novel and improved apparatus for editing text which converts the input text into a different code format for use during the editing/correcting display and, after the editing or correcting has been completed, reconverts the final text back to a code format which is compatible with automatic typesetter operation.

Another object of this invention is to provide a novel and improved apparatus for editing text which has special provision for responding to an end-of-paragraph code sequence in the input text.

Further objects and advantages of this invention will be apparent from the following detailed description of a presently-preferred embodiment with reference to the accompanying drawings.

SYSTEM OUTLINE

Figure 1:
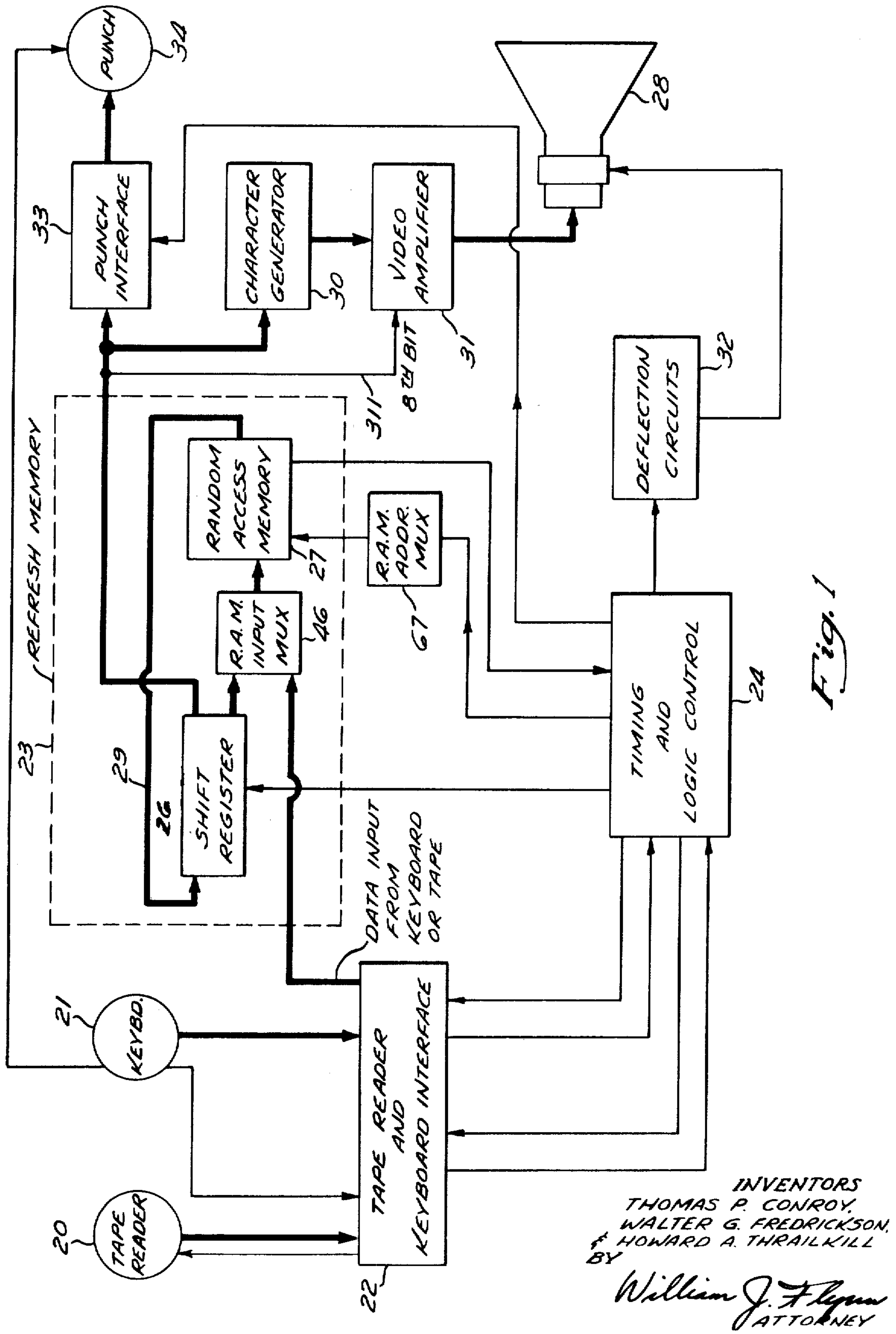
FIG. 1 is a schematic block diagram of an editing or proofing and correcting system which includes the present apparatus.

Referring to FIG. 1, a complete system embodying the present invention is disclosed as comprising data input devices in the form of a tape reader 20 and a keyboard apparatus 21. The respective outputs of the tape reader and the keyboard apparatus are connected through an interface 22 to the input of a refresh memory 23 under the control of a timing and control logic section 24.

The tape reader 20 reads a conventional six-track encoded punched tape containing the unedited or unproofed text which is to be edited or corrected by an operator using the apparatus of the present invention. This text may be line-justified, such as newspaper copy provided by a wire service, such as the Associated Press or United Press International, or it may be unjustified, blind keyboarded tape which originates from locally-generated copy.

The interface 22 performs two principal functions with respect to the input from the tape reader 20:

1. it accepts six-bit characters read by the tape reader and inserts them into the refresh memory 23;
2. it "strips" (rejects) special codes, such as for line justification spaces, appearing on the input tape, so that these special codes are not transmitted to the refresh memory input.

The keyboard apparatus 21 is manually operated by the person using the present editing console to produce individual binary-coded alphanumeric characters and special function codes. The keyboard apparatus itself encodes the selected alpha-numeric character into the standard six-bit TTS (teletypesetter) code, which is then transmitted by the interface 22 to the refresh memory input. Each special function key in the keyboard apparatus operates a unique, single pulse-type switch which produces a D.C. level that the interface 22 then encodes before transmitting to the refresh memory input. The interface 22 contains encoding logic for this purpose, the details of which are omitted from this description as unnecessary to an understanding of the invention.

The refresh memory 23 comprises a relatively large capacity recirculating memory in the form of a dynamic shift register 26 and a random access memory 27 of much smaller capacity. All data entries into the refresh memory 23 are made into the random access memory 27 through an input multiplexer 46 under the control of an address multiplexer 67, and the data thus entered is recirculated back into the recirculating memory 26. The data read-out from the refresh memory takes place at the output of its recirculating memory 26.

The dynamic shift register 26 preferably has metal oxide semiconductor (MOS) storage elements and is capable of storing 2,000 or more eight-bit codes. The shift register continuously recirculates to enable characters to be displayed on the face of a cathode ray tube 28 at a 60 cycle per second refresh rate, as explained hereinafter.

The random access memory 27 is connected through its input multiplexer 46 to the output of the dynamic shift register 26 and it has a storage capacity of 32 eight-bit codes. The random access memory 27 together with the shift register 26 enables the unedited text input from the tape reader 20 which is being recirculated in the refresh memory to be edited in accordance with entries from the keyboard apparatus 21, such as deleting a character and/or inserting a character from the keyboard into a selected location in the text. Any one of the 32 storage addresses or character positions in the random access memory 27 can be accessed under the control of the timing and control logic section 24. That is, the editing change is actually made in the random access memory 27 and then the changed text is recirculated back through the shift register 26 via a feedback circuit 29, so that in the following cycle of operation the text displayed on the screen will include any changes made in the preceding cycle of operation. The time rate of recirculation of successive characters in the shift register 26 is not changed by the editing entries made in the random access memory 27.

The output of the shift register 26 is connected to the input of a character generator 30, which translates the encoded text output from the shift register into a serial pulse train output for turning on and off the beam of the cathode ray tube 28. The character generator 30 includes a large capacity read-only memory which may be accessed by a character code to cause a corresponding unique sequence of serial pulses to be generated. The serial pulse output from the character generator 30 is applied through a video amplifier 31 to the control grid of the cathode ray tube to turn the beam on and off in timed relationship to the vertical and horizontal deflection of the beam by deflection circuits 32 controlled by the timing and control logic section 24.

The deflection circuits 32 produce a rectangular raster scan for each individual alphanumeric character to be displayed. Preferably, the raster scan is in the form of a series of contiguous, side-by-side, upward vertical sweeps. During each vertical sweep the beam may be turned on and off by the video amplifier 31 to produce a vertical, straight line segment, or stroke, of the character. After the completion of each vertical sweep, the beam is blanked during its rapid retrace down to the bottom of the next vertical sweep position to the right in the raster. It will be recognized that, due to inter-character spacing, the character being "painted" in this manner does not occupy the full horizontal width of the raster in which it will appear, and therefore the beam will be blanked throughout the vertical sweeps occurring near the left and right edges of the raster.

The output of the dynamic shift register 26 also is connected to a tape punch interface 33 which, under the control of the timing and control logic section 24, may be actuated from the keyboard apparatus 21 to pass the final edited text from the output of the shift register 26 to a tape punch 34. The punch interface 33 controls the physical operations of the hole-punching elements in the tape punch 34. The edited output tape produced by the tape punch then may be used to provide the input to an automatic typesetter of known design, including, but not limited to, various types of photo-typesetters and computer-operated type-setters.

The sequencing of the events in this system and the operation of the various components so far described are under the control of the timing and control logic section 24. The timing and control logic develops a master clock pulse train which is used to synchronize the rate at which the unedited text is read by the tape reader 20 and uses that clock train to determine the rate at which characters are inserted into the shift register 26, and thus determines the rate at which the tape reader must read in order to input this data. At the output end of the system, the timing and control logic 24 makes the edited text data available to the tape punch 34 at the rate at which the tape punch must accept it. The timing and control logic 24 also controls the accessing of data in the random access memory 27 for editing and other changes, and it synchronizes the analog sweep signals provided by the deflection circuits 32 to the beam deflection elements of the cathode ray tube to the rate at which the digital beam turn-on and turn-off signals are produced by the character generator 30, so that the characters will occur at the correct positions on the face of the cathode ray tube.

The timing and control logic 24 contains all of the "-hard-wired" integrated-circuit logic that, in effect, constitutes the algorithms that perform the various different editing functions under the control of the keyboard apparatus 21 — i.e., how the random access memory 27 is accessed, how and when data is transferred back and forth, etc. For example, to insert a character from the keyboard apparatus 21 into the random access memory 27, a predetermined sequence of events occurs in accordance with the logic permanently wired into the timing and control logic 24. Thus, for each editing function which the operator may want to perform there is a fixed sequence of a priori instructions wired into the timing and control logic 24 which it gives to the random access memory 27 to insure that the desired editing function is performed.

A detailed description of the circuitry for performing the various editing functions, in response to the instructions designated by the selected keys in the keyboard apparatus 21, is disclosed in detail in the concurrently-filed, copending U. S. patent application of Fredrickson, Walter G. et al filed under the title APPARATUS FOR EDITING OR PROOFING AND CORRECTING and assigned Ser. No. 37,177.

Figure 5:
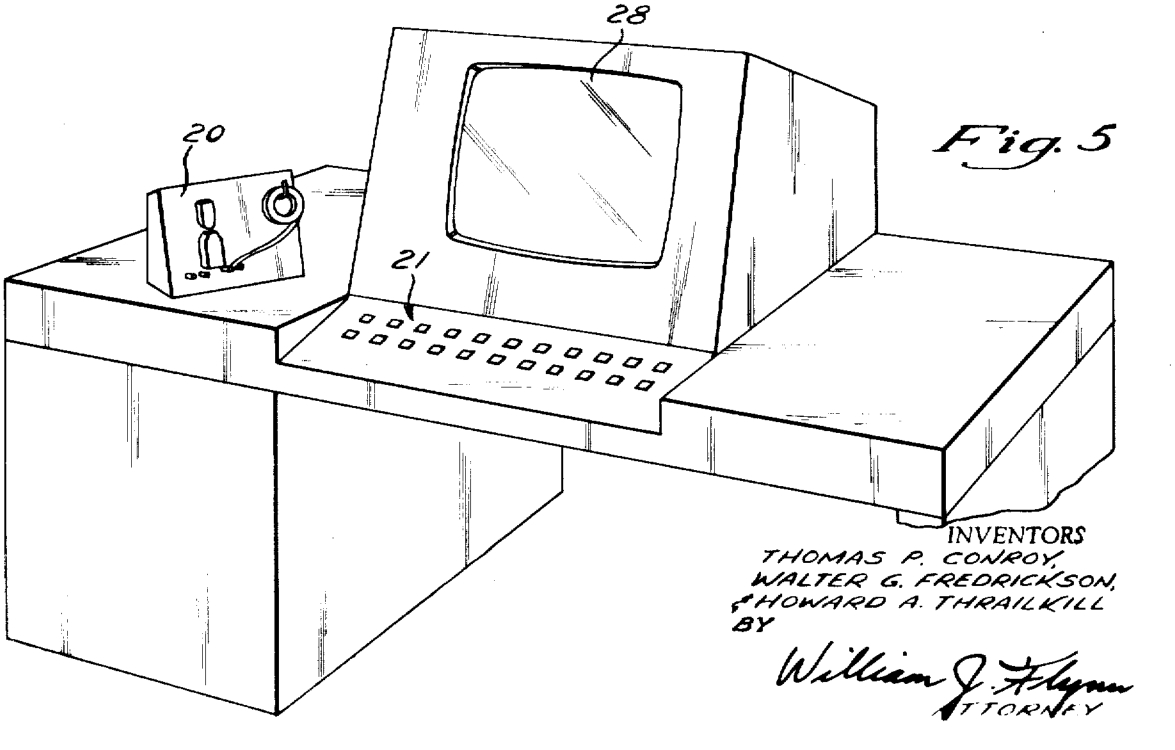
FIG. 5 is a perspective view of an editing console incorporating the input tape reader, the cathode ray tube display, the keyboard and all of the logic circuitry in the FIG. 1 system.

FIG. 5 shows the unitary console which includes the entire system of FIG. 1 except the output tape punch. The keyboard of the keyboard apparatus 21 is positioned directly below and in front of the screen of the cathode ray tube 28. The input tape reader 20 is located to the left of the display screen. The tape reader and keyboard interface 22, the timing and control logic 24, the refresh memory 23, the character generator 30, video amplifier 31, deflection circuits 32 and output punch interface 33 are all contained within the console housing, so that the console is a self-contained "stand-alone" editing unit.

DECODING INPUT TAPES — FIG. 2

In accordance with one important aspect of the present invention, the tape reader and keyboard interface 22 in the editing console contains "hard-wired" logic for stripping unwanted codes in the input from the tape reader 20. Such unwanted codes provide instructions to conventional automatic typesetters but they would be incompatible with the intended operation of the present editing console in providing the desired visual display of the text on the screen of the cathode ray tube 28 and in providing selective editing changes in that text.

For example, if the input to the tape reader 20 is from a justified wire-service tape, it may contain various codes such as THIN SPACE, ELEVATE, PAPER FEED, BELL, UPPER RAIL, LOWER RAIL, SHIFT and UNSHIFT, which will always be stripped in the interface 22. If any of the codes, UPPER RAIL, LOWER RAIL, SHIFT and UNSHIFT is present, the codes for the following character or characters must be modified to change to a capitalized, lower case, bold face or light face display, respectively, as explained hereinafter. Also, the frequently-occurring special codes EM SPACE, EN SPACE, SPACE BAND, and VERTICAL RULE will be stripped in the interface 22 unless they are part of an end-of-paragraph sequence. In addition, the special code sequences on wire-service tapes which designate hyphenation, end of paragraph, or justification spaces must be recognized and modified by the logic in the interface 22 in the present apparatus.

Where the input to the tape reader is a local blind keyboarded tape which is unjustified, various special code sequences must be recognized and modified to designate paragraph marking, capitalization and either bold-face or light-face display.

Figure 2:
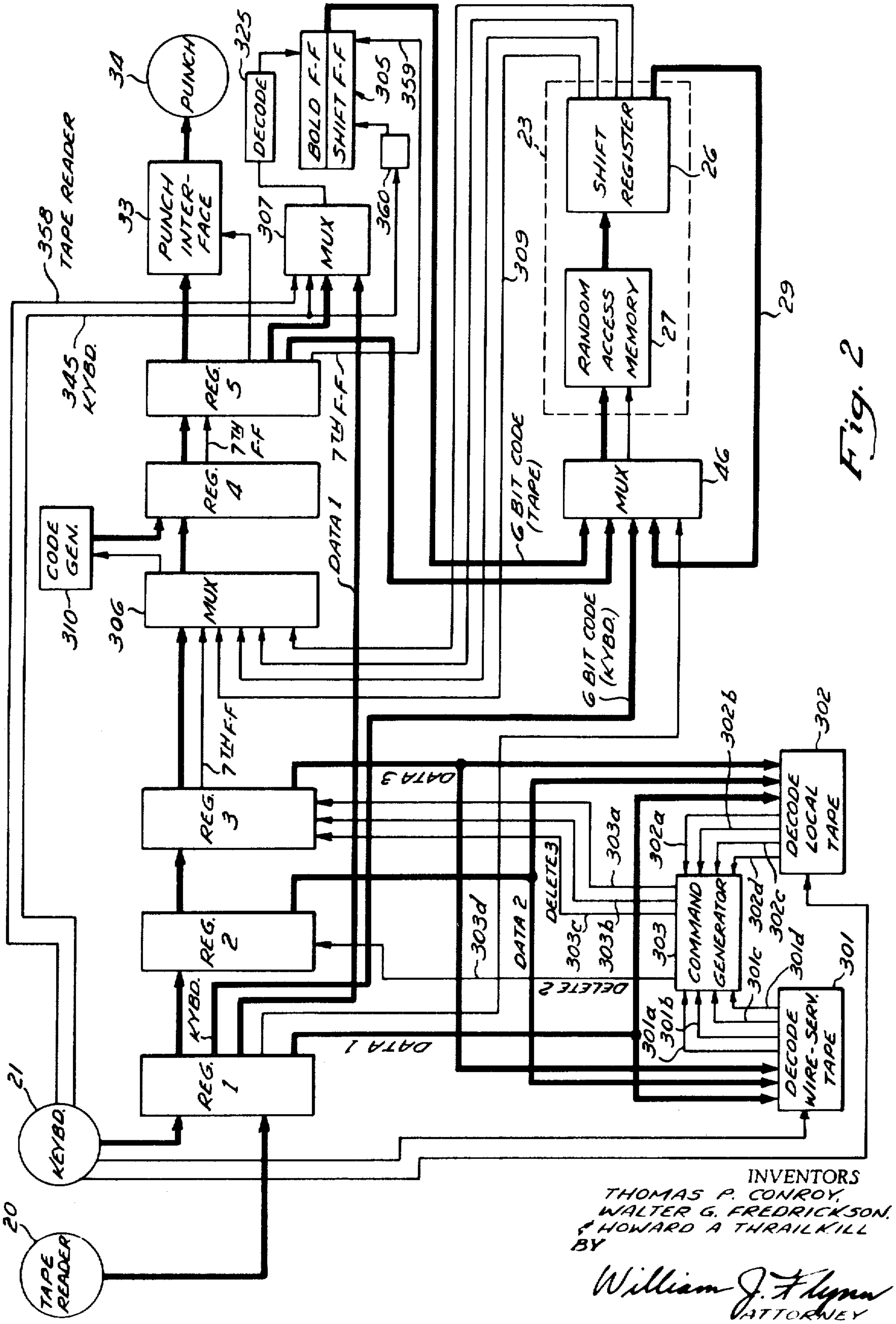
FIG. 2 illustrates schematically the tape reader and keyboard interface in accordance with the present invention, together with other portions of the FIG. 1 system with which the interface coacts.

Referring to FIG. 2, the tape reader and keyboard interface 22 includes five series-connected registers 1, 2, 3, 4 and 5.

Each of these registers has a series of six flip-flops which indicate the corresponding binary values of the 6-bit code which is written in from the input tape or from the keyboard apparatus 21. In addition, registers 3, 4 and 5 each have a seventh flip-flop for a purpose explained later on. Each of the five registers has a marker flip-flop which indicates the presence of data. During the time when the refresh memory 23 is receiving input data from the tape reader 20, registers 4 and 5 act as a buffer. The tape reader operates at a 150 cycles per second rate. The random access memory 27 accepts data at a 167 KHZ rate until registers 4 and 5 are empty. Then the shift register 26 recirculates for one-sixtieth second before again admitting more data at the 167 KHZ rate. During the time when the refresh memory 23 is transmitting output data to the punch 34, registers 4 and 5 act as a buffer between the memory output and the punch.

The keyboard apparatus has a switch for selectively activating either the wire service tape decoder 301 or the local tape decoder 302, depending upon which kind of tape is being read by the tape reader 20.

Both decoders have data inputs from the registers 1, 2 and 3 which are designated "data 1," "data 2" and "-data 3," respectively, in from various output terminals of different flip-flops in register 1, as explained in more detail with reference to FIG. 3. Similarly, the "data 2" input actually includes several lines connected individually to various output terminals of different flip-flops in register 2, and the "data 3" input includes several lines connected individually to various output terminals of different flip-flops in register 3.

The wire-service tape decoder 301 has four output lines **301*a*, 301*b*, 301*c* and 301*d* connected to a command generator 303, which controls the resetting of registers 2 and 3** as follows:

1. a signal on line **301*a* causes the command generator 303 to produce on its output line 303*a* a signal which sets register 3** to store a THIN SPACE six-bit code;
2. a signal on line **301*b* causes the command generator 303 to produce on its output line 303*b* a signal which sets register 3** to store a SPACE BAND six-bit code;
3. a signal on line **301*c* causes the command generator 303 to produce on its output line 303*c* a signal which clears register 3**; and
4. a signal on line **301*d* causes the command generator 303 to produce on its output line 303*d* a signal which clears register 2**.

Similarly, the local tape decoder 302 has four output lines **302*a*, 302*b*, 302*c* and 302*d* connected to command generator 303 such that a signal on line 302*a* causes the command generator to set register 3 to store a THIN SPACE code, a signal on line 302*b* causes the command generator to reset register 3 to store a SPACE BAND code, a signal on line 302*c* causes the command generator to clear register 3, and a signal on line 302*d* causes the command generator to clear register 2**.

In either the wire-service tape mode or the local tape mode, the data coming out of the tape reader 20 advances serially through the registers in the form of a succession of six-bit codes, each of which is first stored in register 1, then in register 2, and so on. Whichever decoder 301 or 302 is then in use reads the registers 1, 2 and 3 to determine whether the coded data therein includes either a single six-bit code in one of these registers or a sequence of six-bit codes in the registers which must be either deleted or modified.

For example, in the wire-service mode, an end-of-line hyphen in the wire-service test will be designated by the code sequence HYPHEN-RETURN-ELEVATE. Consequently, if this code sequence appears, when the six-bit code for HYPHEN is in register 3, the six-bit code for RETURN will be in register 2, and the six-bit code for ELEVATE will be in register 1. The decoder 301 will recognize this code sequence in the registers and it will signal the command generator to:

1. delete the HYPHEN code in register 3; and
2. delete the RETURN code in register 3 in the next cycle of operation (when it is transferred from register 2 into register 3); and
3. delete the ELEVATE code when it appears in register 2 in the next cycle of operation.

As another example, in the local tape mode of some systems the code sequence QUAD LEFT-RETURN-EM SPACE designates end of paragraph, followed by a normal indent of the next line. Consequently, if this code sequence appears, when the 6-bit code for QUAD LEFT is in register 3, the six-bit code for RETURN will be in register 2, and the six-bit code for EM SPACE will be in register 1. The decoder 302 will recognize this code sequence and will signal the command generator to delete the six-bit codes, QUAD LEFT and RETURN, and to replace them by a single end-of-paragraph code, and to pass the six-bit EM SPACE code following this end-of-paragraph code.

In addition, the command generator 303 provides a signal which operates a seventh flip-flop in register 3. This seventh flip-flop in register 3 operates corresponding flip-flops in registers 4 and 5 as the six-bit code is transferred into and out of these registers in succession. The output of register 5 is operatively connected to bold and shift flip-flops in clock 305 which, during the time when the refresh memory 23 is receiving input data from the tape reader 20 or from the keyboard apparatus, add seventh and eighth bits to the six-bit data codes, as explained in detail hereinafter with reference to FIG. 4. Normally, these seventh and eighth bits indicate the shift or unshift and bold or light condition of each character. For codes used internally, BELL, THIN SPACE, and ADD THIN SPACE, the seventh and eighth bits are temporarily held at zero except for an end-of-paragraph situation. When the end-of-paragraph code sequence occurs, the seventh flip-flop associated with register 5 temporarily modifes the outputs of the shift and bold flip-flops in block 305 to add a binary 1 seventh bit and a binary zero eighth bit to the THIN SPACE code.

The six-bit code output from register 3 passes through a multiplexer 306 into register 4, and from register 4 the six-bit code output passes into register 5, which is the output register of the interface when the input to the refresh memory is from the tape reader 20. When the punch 34 is disabled and the refresh memory 23 is operating to receive input data, the six-bit code output from register 5 normally passes through a multiplexer 307 and a decoder 325, which controls the operation of the previously-mentioned shift and bold flip-flops in block 305 for adding the seventh and eighth bits to each six-bit code in the manner to be explained with reference to FIG. 4.

The decoder 325 is operatively connected to sense the six-bit code in register 5, so that whenever this code is the code for SHIFT, UNSHIFT, UPPER RAIL, or LOWER RAIL, decoder 325 causes a command generator to delete this code in register 5 and also to control the bold and shift flip-flops in block 305 to add seventh and eighth bits to the next character code, as follows:

1. if the SHIFT code was detected in register 5, the seventh bit is 1 and it remains 1 for each character code that follows until an UNSHIFT code comes into register 5;
2. when the UNSHIFT code occurs, the seventh bit is zero for each character code that follows until the SHIFT code occurs again;
3. when the UPPER RAIL code appears in register 5, the eighth bit is 1 for each character code that follows until the LOWER RAIL code comes into register 5;
4. when the LOWER RAIL code appears, the eighth bit is zero for each character code that follows until the UPPER RAIL code appears again.

The six-bit codes, other than for SHIFT, UNSHIFT, UPPER RAIL and LOWER RAIL, which come into register 5 are not deleted or otherwise modified by the decoder 325 and a command generator. The only modification of such codes is the addition of the seventh and eighth bits at block 305.

When the seventh bit added is binary zero, this indicates a lower case character; a binary 1 seventh bit indicates an upper case character.

When the added eighth bit is binary zero, this causes the character to be displayed on the screen of the cathode ray tube 28 with only ordinary brightness. However, when the bold flip-flop in block 305 is operated to make the added eighth bit binary 1, the character is displayed with extra brightness, indicating bold face type.

As indicated schematically in FIG. 1, this eighth bit in each character code is applied via line 311 to the video amplifier 31 to control the brightness or intensity of the cathode ray beam. When this eighth bit is binary zero, the pulse output of the video amplifier 31 has a predetermined "normal" amplitude, so that the character being generated will have a normal brightness. However, when this eighth bit is binary 1, it increases the amplitude of the pulse output of video amplifier 31 so that the beam intensity will be noticeably increased and the character displayed on the screen will be extra bright. This is an important and advantageous aspect of the present invention since it provides a relatively simple and convenient way of directly indicating visually to the console operator, by the brightness of the displayed character, whether the character so displayed would be either bold face or light face when the typesetter is operated from this data.

In the wire-service or local tape input, this light-face or bold-face instruction is ordinarily provided to the automatic typesetter by a six-bit LOWER RAIL code (for light face) or a six-bit UPPER RAIL code (for bold face).

After the seventh and eighth bits (both usually zero) are added to the incoming six-bit codes by the flip-flops in block 305, the eight-bit data codes pass to an input multiplexer 46 and from there into the data input of the random access memory 27, from which they pass into the shift register 26.

After the shift register 26 has been almost filled, the tape reader 20 is disabled and the data begins recirculating from the output of the shift register back into the input multiplexer 46 and then back into the random access memory 27 and then back into the shift register.

During such recirculation of the data, the console operator may make editing changes by operating keys in the keyboard apparatus 21. These editing changes appear on the screen of the cathode ray tube 28 so that the data displayed corresponds to the data in the refresh memory 23, which is the data originally inputted from the tape reader 20 and then modified by the keyboard editing changes.

After the console operator has made all of the desired editing changes, so that the data displayed on the screen of the cathode ray tube is precisely what he wants to be printed, he can actuate a key in the keyboard apparatus 21 for punching out this data.

When he does this, the data is read out of the shift register via line 309 into the multiplexer 306 located ahead of registers 4 and 5. The read-out data is transferred through registers 4 and 5 into the punch interface 33. The punch interface deletes the seventh and eighth bits in the eight-bit codes coming out of register 5, converting these eight-bit codes to six-bit codes on which the conventional punch 34 operates. Thus, it will be understood that the original unedited six-bit codes on the input tape are converted to eight-bit codes for purposes of operating the editing display on the screen of the cathode ray tube, and after this has been done they are re-converted to 6-bit codes for operating the punch 34 which punches the edited text on the output tape.

A special situation exists when the end-of-paragraph eight-bit code (consisting of the six-bit code for THIN SPACE, plus 1 and 0 as the seventh and eighth bits, respectively) comes out of the shift register 26 into the multiplexer 46. This situation will be explained in detail in a following section describing code reconversion.

WIRE-SERVICE TAPE DECODER — FIG. 3

Figure 3:
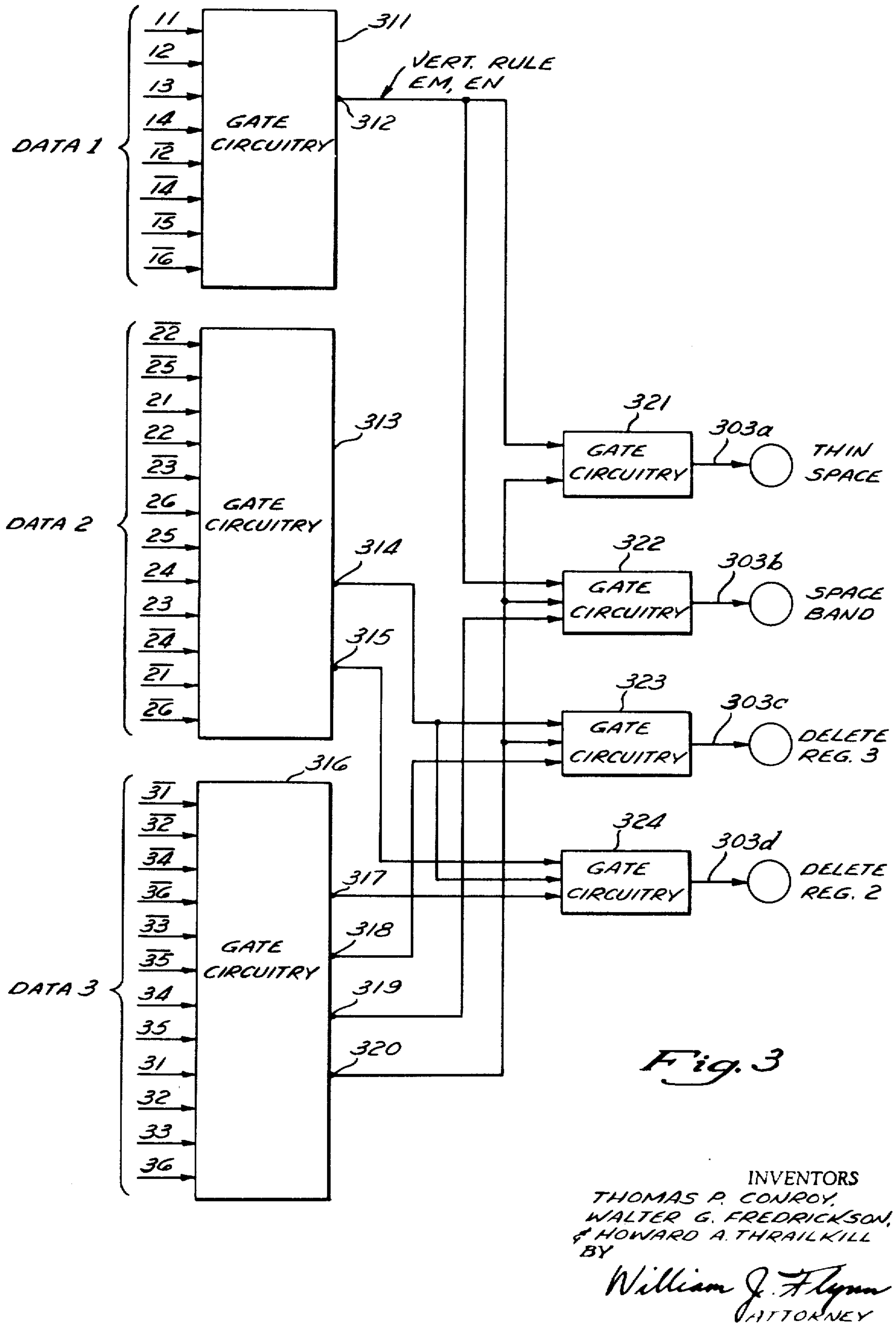
FIG. 3 illustrates schematically the wire service tape decoder in this interface.

FIG. 3 illustrates schematically in block diagram form a portion of the decoder 301 in FIG. 2 which decodes the data input from the wire-service tape when the latter is being read by the tape reader 20. This portion of the decoder modifies the data in registers 3 and/or 2 when certain code sequences or combinations occur in the wire-service tape input from the tape reader 20 into the registers 1, 2 and 3.

In addition, decoder 301 has additional logic circuits which cause the following Teletype six-bit codes to be deleted whenever they appear in the registers: THIN SPACE, ELEVATE, PAPER FEED, and BELL.

The "data 1" input to decoder 301 in FIG. 3 has 8 individual input lines leading from output terminals of the six flip-flops in register 1. In FIGS. 3, each of these input lines is designated by a two-digit number, the first one designating the register to which it is connected (in all cases, register 1), and the second designating the flip-flop output terminal in register 1 to which it is connected. For example, line 11 in FIG. 1 is connected to the Q (true) output terminal of the first flip-flop in register 1; line $\overline{14}$ is connected to the $\overline{Q}$ (false) output terminal of the fourth flip-flop in register 1.

The "data 2" input in FIG. 3 has 12 individual input lines which are similarly designated, each being connected to an output terminal of a particular one of the six flip-flops in register 2.

The same is true of the "data 3" input, which has 12 individual input lines which are connected to respective output terminals of the first six flip-flops in register 3.

The "data 1" input lines are connected to the inputs of various gates which make up gate circuitry 311, having a single output terminal 312. Similarly, the "data 2" input lines are connected to the inputs of various gates which make up gate circuitry 313, having two output terminals 314 and 315. The "data 3" input lines are connected to the inputs of various gates which are interconnected to provide gate circuitry 316, having four output terminals 317, 318, 319 and 320.

The output terminal 312 of the "data 1" gate circuitry 311 and the output terminal 320 of the gate circuitry 316 are connected respectively to the two inputs of additional gate circuitry 321, which has a single output terminal 303*a*. A true signal appears on terminal 303*a* only in the event that the six-bit code in register 1 is for either EM SPACE, EN SPACE or VERTICAL RULE, and the six-bit code in register 3 is for RETURN, which indicates that the code in register 1 is part of an end-of-paragraph code sequence: RETURN, ELEVATE; and EM SPACE, EN SPACE, or VERTICAL RULE. When the signals on both inputs 312 and 320 to gate circuitry 321 are true, an output signal appears on line 303*a*, instructing the command generator 303 to delete register 3 and insert therein the six-bit code for THIN SPACE, and also to operate the seventh flip-flop in register 3 so that the shift flip-flop in clock 305 will add a binary 1 seventh bit to this six-bit THIN SPACE code when it arrives there.

The output terminal 312 of the "data 1" gate circuitry 311 and the output terminals 319 and 320 of the "data 3" gate circuitry 319 are connected to respective inputs to additional gate circuitry 322, which has a single output terminal 303*b*. A true signal appears on terminal 303*b* only under the following conditions:

1. register 3 has a SPACE BAND code or an ADD THIN SPACE code; or
2. register 3 has a RETURN code and register 1 has neither an EM SPACE, nor an EN SPACE, nor a VERTICAL RULE code.

If either condition 1 or 2 is satisfied, the signal on terminal 303*b* will cause the command generator 303 to provide a SPACE BAND code in register 3.

The output terminal 314 of the "data 2" gate circuitry 313 and the output terminals 318 and 320 of the "data 3" gate circuitry 316 are connected to respective inputs to additional gate circuitry 323, which has a single output terminal 303*c*. A true signal appears on terminal 303*c* only under the following conditions:

1. a HYPHEN code is in register 3 and a RETURN code is in register 2; or
2. register 3 has either a THIN SPACE code or a SPACE BAND code, and register 2 has either an EM SPACE CODE or an EN SPACE code or a VERTICAL RULE code or an ADD THIN SPACE code or a SPACE BAND code or a THIN SPACE code or a RETURN code.

If either of the last-mentioned conditions 1 or 2 is satisfied, the signal on terminal 303*c* will cause the command generator 303 to delete register 3.

The output terminals 314 and 315 of the "data 2" gate circuitry 313 and the output terminal 317 of the "-data 3" gate circuitry 316 are connected to respective inputs to additional gate circuitry 324, which has a single output terminal 303*d*. A true signal appears on terminal 303*d* only under the following conditions:

1. register 3 has a HYPHEN code and register 2 has a RETURN code; or
2. register 2 has either a THIN SPACE code or an EM code or an EN code or a VERTICAL RULE code or a PAPER FEED code or an ELEVATE code or a BELL code, and neither register 3 nor register 4 contains the end-of-paragraph code.

The various gates and inverters in blocks 311, 313, 316, 321, 322, 323 and 324 are interconnected in accordance with the standard Teletype six-bit codes for SPACE BAND, ADD THIN SPACE, RETURN, EM SPACE, EN SPACE, VERTICAL RULE, HYPHEN, THIN SPACE, PAPER FEED, ELEVATE, and BELL to perform the functions just indicated. A more detailed description of these gating circuits is believed to be unnecessary because they can be designed by one of ordinary skill in the digital logic art, given the codes themselves, the input connections to gate circuits 311, 313 and 316 from registers 1, 2 and 3 as specified herein, and the desired output functions specified herein.

LOCAL TAPE DECODER

When the input to the tape reader is from an unjustified local tape, the decoder 302 is activated by depressing a "local" switch in the keyboard apparatus 21. In this local mode, the only code stripping or modification that is required occurs for 1. normal paragraph marking,
2. capitalization, and
3. the interpretation of UPPER RAIL to mean a bold face display and LOWER RAIL to mean a light face display.

As already explained, when an end-of-paragraph sequence (QUAD LEFT-RETURN- and a particular space code) from the local tape appears in registers 1–3, it is converted to a code sequence which includes as the first code the six-bit code for THIN SPACE plus a binary 1 seventh bit plus a binary zero eighth bit.

Capitalization of one character or a sequence of characters is indicated on the input tape by a six-bit code for SHIFT. As already explained, this SHIFT code is deleted and the following six-bit character code has added to it a binary 1 seventh bit, which serves as the SHIFT code for this character as long as it is in the refresh memory 23 and is being displayed on the screen of the cathode ray tube 28.

Similarly, the bold face type display is indicated on the input tape by a six-bit code for UPPER RAIL. As already explained, this UPPER RAIL code is deleted and following six-bit character codes have added to them (until a LOWER RAIL code appears) a binary 1 eight bit, which serves as a BOLD code for this character as long as it is in the refresh memory 23 and is being displayed on the screen of the cathode ray tube 28.

ADDING SEVENTH AND EIGHTH BITS

Figure 4:
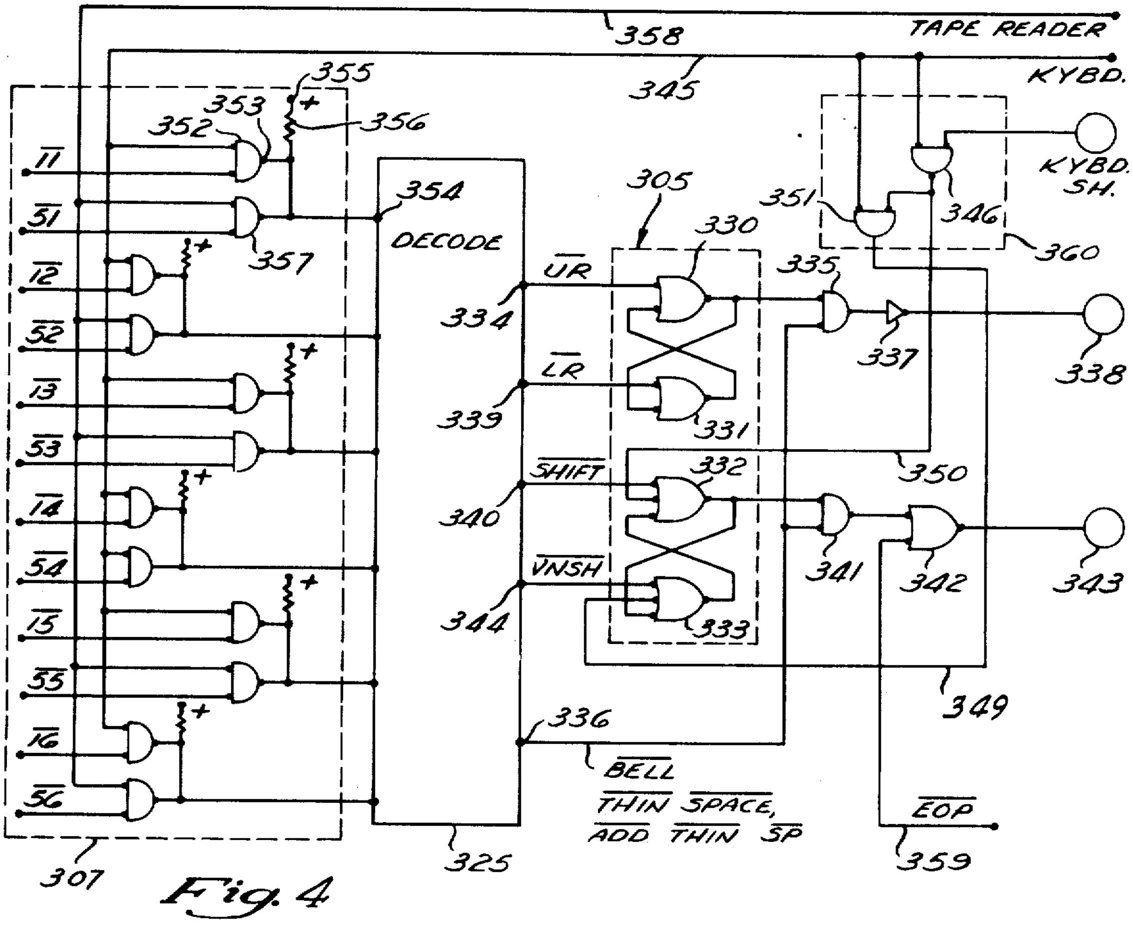
FIG. 4 illustrates schematically the circuitry in this interface which adds seventh and eighth bits to the six-bit input tape codes for use in the display.

FIG. 4 illustrates schematically the circuitry by which the 7th and 8th bits are added to the 6-bit codes before being entered into the refresh memory 23.

In FIG. 4 the bold flip-flop in block 305 comprises a pair of cross-coupled OR gates 330 and 331. The shift flip-flop in block 305 comprises a pair of cross-coupled OR gates 332 and 333.

One input terminal of OR gate 330 is connected to an output terminal 334 of the decoder 325 to receive a ground signal when this decoder detects an UPPER RAIL six-bit code either:

1. in register 5 when the tape reader and keyboard interface 22 (FIG. 1) is receiving its input from the tape reader 20; or
2. in register 1 when the interface 22 is receiving its input from the keyboard apparatus 21.

When OR gate 330 receives such a signal, its output goes to a high potential to provide one enabling input to an AND gate 335.

The second input to this AND gate is normally high, since it is connected to an output terminal 336 of the decoder 325 which only becomes grounded if the decoder 325 detects either a BELL six-bit code or a THIN SPACE six-bit code or an ADD THIN SPACE six-bit code in either register 1 or register 5 (depending upon whether the interface 22 is receiving its input from the keyboard apparatus 21 or from the tape reader 20). Obviously, such a code should not be present at the same time in the same register as the UPPER RAIL code which enables the OR gate 330, so that in the absence of a circuit malfunction the detection of the UPPER RAIL code by decoder 325 should enable the AND gate 335.

The enabling of AND gate 335 causes its output to go low and this signal is inverted by an inverter 337 to provide on output terminal 338 a positive signal for causing the eighth data bit to be binary 1.

The bold flip-flop 330, 331 remain in this condition until it is reset in response to the detection of a LOWER RAIL six-bit code by the decoder 325, which then causes the output terminal 339 of this decoder to go to ground. This happens when the LOWER RAIL code appears in register 5 while the interface 22 is receiving its input from the tape reader 20, or it happens when the LOWER RAIL code appears in register 1 while the interface 22 is receiving its input from the keyboard apparatus 21. Such resetting of the bold flip-flop causes the output terminal 338 to become grounded so that the eighth data bit becomes binary zero.

The shift flip-flop 332, 333 in block 305 is set in response to the detection by decoder 325 of a SHIFT six-bit code in register 5 when the input to the interface 22 is from the tape reader 20. This causes the output terminal 340 of decoder 325 to go from its normally high potential down to ground, thereby enabling OR gate 332 which, in turn, provides an enabling input to AND gate 341, which has a normally-high input from the previously-mentioned output terminal 336 of decoder 325. The output of AND gate 341 is applied through an OR gate 342 to an output terminal 343, which now causes a binary 1 seventh bit to be added to the six-bit code coming out of register 5.

The shift flip-flop 332, 333 will be reset in response to the detection of an UNSHIFT six-bit code in register 5 by the decoder 325 when the input to the interface 22 is from the tape reader 20. This causes the normally-high output terminal 344 of decoder 325 to become grounded, so that the output terminal 343 also becomes grounded. Consequently, the eighth bit added to the 6-bit code coming out of register 5 will be binary zero.

The shift flip flop 332, 333 also may be set and reset from the keyboard apparatus 21 as follows:

When the input to the interface 22 is from the keyboard apparatus 21 (instead of from the tape reader 20), a high potential appears on line 345.

Line 345 provides one input to an AND gate 346. A second input to this AND gate is from the "shift" key in the keyboard apparatus 21. When this shift key is depressed, the second input terminal of AND gate 346 becomes positive.

Therefore, before the "shift" key is operated, AND gate 346 is disabled. However, when the "shift" key is operated, AND gate 346 is enabled, causing its output line 350 to go to ground and apply an enabling signal input to OR gate 332. This sets the shift flip-flop 332, 333, as described, causing the output terminal 343 to go positive.

This condition prevails only as long as the "shift" key in the keyboard apparatus is held down. As soon as it is released, the AND gate 346 in block 360 will be disabled, so that its output will go high. This enables an AND gate 351, which has one input connected to the output of AND gate 346 and a second input connected to line 345. The output of AND gate 351 is connected via line 349 to an input terminal of OR gate 333, so that when AND gate 351 is enabled the shift flip-flop 332, 333 will be reset and the output terminal 343 will become grounded.

An advantage of this arrangement is that the shift operation, when operating from the keyboard apparatus, is similar to the action provided by a conventional secretarial typewriter. That is, the shift (upper case) condition is maintained only while the "shift" key is depressed; the unshift condition is restored immediately when the "shift" key is released. Consequently, there is no necessity to actuate an "unshift" key, as in the case of the specialized graphic arts keyboard.

The input terminals of the decoder 325 are connected to the output terminals of multiplexer 307. The latter has several pairs of AND gates, with one AND gate of each pair operating when the input to the tape reader and keyboard interface 22 is from the tape reader 20, and the other AND gate of each pair operating when the input to interface 22 is from the keyboard apparatus 21.

Taking one pair of these AND gates as an illustration, the AND gate 352 has one input connected to line 345 which, as already explained, is at high potential when the input to the random access memory 27 is from the keyboard apparatus 21. AND gate 352 has a second input terminal connected to the $\bar{Q}$ output terminal of the first flip-flop in register 1. When this input becomes positive, the output terminal 353 of AND gate 352 becomes grounded and provides a signal input to one input terminal 354 of decoder 325. Normally, terminal 354 is at the high positive potential of a voltage source connected to input terminal 355. A resistor 356 is connected at one end to terminal 355 and at the opposite end to terminals 353 and 354. With this arrangement, normally terminal 354 is at high potential, but it becomes grounded in response to the enabling of AND gate 352.

The same action takes place in response to the enabling of the second AND gate 357 of this pair. This AND has a first input connected to line 358, which has a high positive potential when the appropriate key in the keyboard apparatus 21 is operated to connect the tape reader 20 output into the interface 22. A second input to AND gate 357 is connected to the $\bar{Q}$ output terminal of the first flip-flop in register 5.

Each of the other input terminals of the decoder 325 is similarly connected to a pair of AND gates, one of which operates when the data input is from the keyboard apparatus 21 and the other of which operates when the data input is from the tape reader 20. The AND gates of each pair are connected to corresponding flip-flops in registers 1 and 5, respectively.

The logic circuitry in the decoder 325 is designed in accordance with the particular six-bit Teletype codes which are to be detected, namely, the codes for UPPER RAIL, LOWER RAIL, SHIFT, UNSHIFT, BELL, THIN SPACE, and ADD THIN SPACE. Accordingly, it is believed to be unnecessary to show and describe this logic circuitry in specific detail.

END-OF-PARAGRAPH CODE SEQUENCE

As already explained, when an end-of-paragraph code sequence appears in registers 1–3, this code sequence is replaced by a THIN SPACE six-bit code, to which is added a binary 1 seventh bit and a binary 0 eighth bit. When the input to the tape reader 20 is from a justified wire service tape, the end-of-paragraph code sequence is RETURN — ELEVATE — EM space; when the input is from an unjustified local tape, the end-of-paragraph code sequence is QUAD LEFT — RETURN — EM SPACE. In either case, the code in register 3 is replaced by the six-bit code for THIN SPACE and the seventh flip-flop in register 3 is operated.

As this six-bit code proceeds through register 4 and into register 5, a seventh flip-flop in register 4 is operated and then a seventh flip-flop in register 5 is operated. This latter flip-flop produces a ground signal on line 359 in FIG. 4, which enables the OR gate 342 to cause a high potential to appear on output terminal 343 to cause the seventh bit which is added to the THIN SPACE 6-bit code to be binary 1.

At the same time, the presence of this THIN SPACE six-bit code in register 5 inhibits the outputs of both the bold flip-flop 330, 331 and the shift flip-flop 332, 333. This is because the output terminal 336 of decoder 325 becomes grounded in response to the detection of the THIN SPACE six-bit code in register 5, so that the second inputs to both AND gates 335 and 341 are grounded. Consequently, while the output terminal 343 for the seventh bit will go positive in response to the operation of the seventh flip-flop in register 5, the output terminal 338 for the eighth bit will be held grounded. This inhibiting of the bold and shift flip-flop outputs lasts only as long as the THIN SPACE six-bit code (which, with the addition of the binary 1 seventh bit and the binary zero eighth bit, will signify end-of-paragraph in the refresh memory 23) remains in register 5.

CODE RECONVERSION FOR PUNCH OPERATION

When the data is being read out of the shift register 26 into the punch 34, the appearance of the eight-bit end-of-paragraph code (THIN SPACE 1 0) at the output of the shift register causes a command signal on line 309 to the multiplexer 306 ahead of registers 4 and 5. This command signal enables a special code generator 310, which writes into register 5 in succession the respective six-bit codes for QUAD LEFT and RETURN ahead of the particular eight-bit space code which follows the eight-bit end-of-paragraph code at the output of the shift register 26. At the same time, the multiplexer rejects this eight-bit end-of-paragraph code, so that it cannot be entered from the shift register output into register 4.

Consequently, the end-of-paragraph code sequence coming out of register 5 into the punch interface 34 will be:

1. the six-bit code for QUAD LEFT;

2. the six-bit code for RETURN; and
3. the eight-bit code consisting of the six-bit space code and binary zero seventh and eighth bits.

The punch interface 33 deletes the last-mentioned seventh and eighth bits, so that the end-of-paragraph code sequence which goes into the punch 34 is the same as an end-of-paragraph code sequence on an unjustified local tape.

Essentially similar operations take place on any eight-bit code coming out of the shift register 26 which has a binary value for either the seventh or eighth bit that is different from the corresponding value of that bit in the immediately preceding code.

For example, if the preceding eight-bit code had binary zero seventh and eighth bits (indicating light face, lower case type) and the eight-bit code now coming out of the shift register has a binary 1 seventh bit and a binary zero eighth bit (indicating upper case, light face type), the code generator 310 is activated to pass a six-bit SHIFT code into register 4 just ahead of this eight-bit code. Consequently, the punch interface 33 will receive, in sequence, the six-bit SHIFT code and the eight-bit character code. The punch interface then deletes the seventh and eighth bits from this character code, so that the punch 34 will receive the same six-bit codes for SHIFT and the character to be capitalized as were present on the input tape.

Similarly, if the preceding eight-bit code had binary zero seventh and eighth bits and the eight-bit code now at the shift register output has a binary zero seventh bit and a binary 1 eight bit (indicating lower case, bold face), the multiplexer 306 will activate the code generator 310 to pass a six-bit code for UPPER RAIL into 33 will receive, in sequence, 4 just ahead of this eight-bit code. Consequently, the punch interface 33 will receive, in sequence, the UPPER RAIL six-bit code and the eight-bit character code. The punch interface deletes the seventh and eighth bits of this latter code, so that the punch will receive, in sequence, the six-bit UPPER RAIL code and the six-bit code for the character which is to be typeset in bold face.

Similar operations take place to introduce either a six-bit UNSHIFT code or a six-bit LOWER RAIL CODE ahead of a character code coming out of the shift register whose seventh or eighth bit has a different binary value from that of the preceding character code.

From the foregoing it will be clear that the novel interface in the present invention ahead of the refresh memory and the visual editing display apparatus comprises decoders having permanently interconnected gate circuits (i.e., "hard-wired" logic) which perform logic functions specified by their own intrinsic logic and the interconnections among them. This does away with the necessity of providing a computer connected between the input tape and the refresh memory and editing display and which is programmed to carry out the desired code-stripping and code-conversion functions functions described. This makes possible the provision of a self-contained, "stand-alone" editing console not requiring external connections to a computer because all of the necessary logical operations are performed by logic circuits contained within the console itself.

While a presently-preferred embodiment of this invention has been described in detail with reference to the accompanying drawings, to is to be understood that various modifications departing from the disclosed embodiment may be adopted without departing from the scope of the present invention.

We claim:

1. An apparatus for displaying text comprised of graphic characters, said apparatus comprising a refresh memory having means for cyclically recirculating coded data stored therein, said data including character codes for characters to be displayed and control codes for controlling the display of the character, visual display means for displaying coded character data being recirculated in the refresh memory, means for selectively in putting coded data into and making changes in the coded data stored in the refresh memory and displayed on said visual display means including input means for receiving encoded input text data comprising character codes for graphic characters to be displayed and special codes including a first special code representing a first display condition for characters following said first code, and an interface connected to said input means and including first means set in a first condition in response to said first special code to modify the encoded input text data transmitted to said refresh memory to effect a change in the display of the character or character codes of said input text following said first code and responsive to a second special code in said input data for changing said first means from said first condition.

2. An apparatus according to claim 1 wherein said visual display means comprises second means responsive to said coded data for controlling the visual appearance of a character displayed in response to a character code and said first means includes means operative in response to a first special code comprising an UPPER RAIL code in the input text to change said input data to effect a change in the appearance on said visual display means of a character or characters whose codes follow said UPPER RAIL code in the input text.

3. An apparatus according to claim 2 wherein said visual display means includes a cathode ray tube for displaying the characters and said second means is actuated in response to coded data to control the brightness of the display, and said first means comprises means for modifying character codes following said UPPER RAIL code to provide a first brightness for said following character codes when displayed.

4. An apparatus according to claim 3 in which said first means is responsive to a special code comprising a LOWER RAIL code in the input text to modify said encoded input text data to cause the brightness of the displayed character or characters whose codes follow said LOWER RAIL code to have a brightness substantially below the brightness of the character or characters following said UPPER RAIL code.

5. An apparatus according to claim 4 wherein said first means comprises means to prevent said UPPER RAIL and LOWER RAIL codes from being entered into the refresh memory and means for adding to the character codes which follow said UPPER RAIL and LOWER RAIL codes an additional bit which designates the corresponding level of brightness.

6. An apparatus according to claim 1 wherein said first means is responsive to said first code which is a special SHIFT code in the input text to modify the encoded input text data to cause the character or characters whose codes follow said SHIFT code in the input text to be capitalized on said visual display means.

7. An apparatus according to claim 6 wherein said first means comprises means operative in response to a special UNSHIFT code in the input text to cause said visual display means to modify the encoded input data to effect display in lower case form for the character or characters whose codes follow said UNSHIFT code in the input text.

8. An apparatus according to claim 7 wherein said first means includes means to prevent said SHIFT and UNSHIFT codes from being entered into the refresh memory and means for adding to the character codes which follow said SHIFT and UNSHIFT codes an additional bit which designates capitalization or lower case display.

9. An apparatus according to claim 1 wherein said first means includes means for detecting a standard end-of-paragraph code sequence in the input text and for converting same into a different code format for effecting an end-of-paragraph operation of said visual display means.

10. An apparatus according to claim 1 wherein said first means comprises decoder means having permanently interconnected gate circuits which perform logic functions specified by their intrinsic logic and the interconnections among them.

11. An apparatus for editing encoded text read by a tape reader from an input tape and having character codes and special codes recorded sequentially thereon, said apparatus comprising:

a console having a cathode ray tube display assembly, a manually operable keyboard apparatus, a refresh memory and an interface connected at the input side of said memory, all mounted in a unitary assembly;

said refresh memory having means for cyclically recirculating the data entered into its input;

said cathode ray tube display assembly being connected to said refresh memory to display the text in accordance with the sequence in which the data are recirculated in the refresh memory;

said keyboard apparatus being selectively operable to modify the data in the refresh memory so as to provide selected changes in the test displayed by said cathode ray tube apparatus;

and said interface including tape reader means for receiving said tape which includes encoded input data to be displayed, including graphic character codes and special control or information codes, decoding means for detecting certain individual special codes and code sequences and first means responsive to said decoding means for modifying the display of characters in encoded input data following a predetermined special code in a predetermined manner until another and different special code is received.

12. An apparatus according to claim 11 wherein said first means comprises means for inserting coded data for characters following a predetermined special code on said tape to modify the brightness of characters following the special code in the input data when the characters are displayed on the cathode ray tube.

13. An apparatus according to claim 11 wherein said first means comprises means responsive to a predetermined special code on said tape for inserting coded data for characters following the predetermined special code in the encoded input data for capitalizing or not the characters displayed on the cathode ray tube.

14. An apparatus according to claim 11 wherein said decoder means detects certain special codes read from input tape and said first means comprises means operable by said decoder means for deleting said certain predetermined special codes before entry into the refresh memory.

15. An apparatus according to claim 11 wherein said first means comprises means for adding to the character codes before entry into the refresh memory additional bits which respectively specify or not the respective character is to be capitalized and whether or not the character is to be displayed with extra brightness on the cathode ray tube.

16. An apparatus according to claim 11, wherein said interface comprises:

a first group of registers connected in series and each having provision for storing a single character code or special code read in from the input tape;

first decoder means connected to said first group of registers to sense predetermined individual special codes and code sequences therein;

means operable by said first decoder means for deleting or modifying said predetermined special codes and code sequences;

an output register operatively connected to said first group of registers to receive the individual codes serially therefrom;

second decoder means connected to said output register to sense certain special codes therein;

and means operable under the control of said second decoder means to add to each character code coming out of the output register additional bits which determine the manner in which the corresponding character is displayed by the cathode ray tube.

* * * * *